Sept. 5, 1933.   R. H. BROWNLEE   1,925,131
CARBON BLACK PRODUCER
Filed Dec. 26, 1931
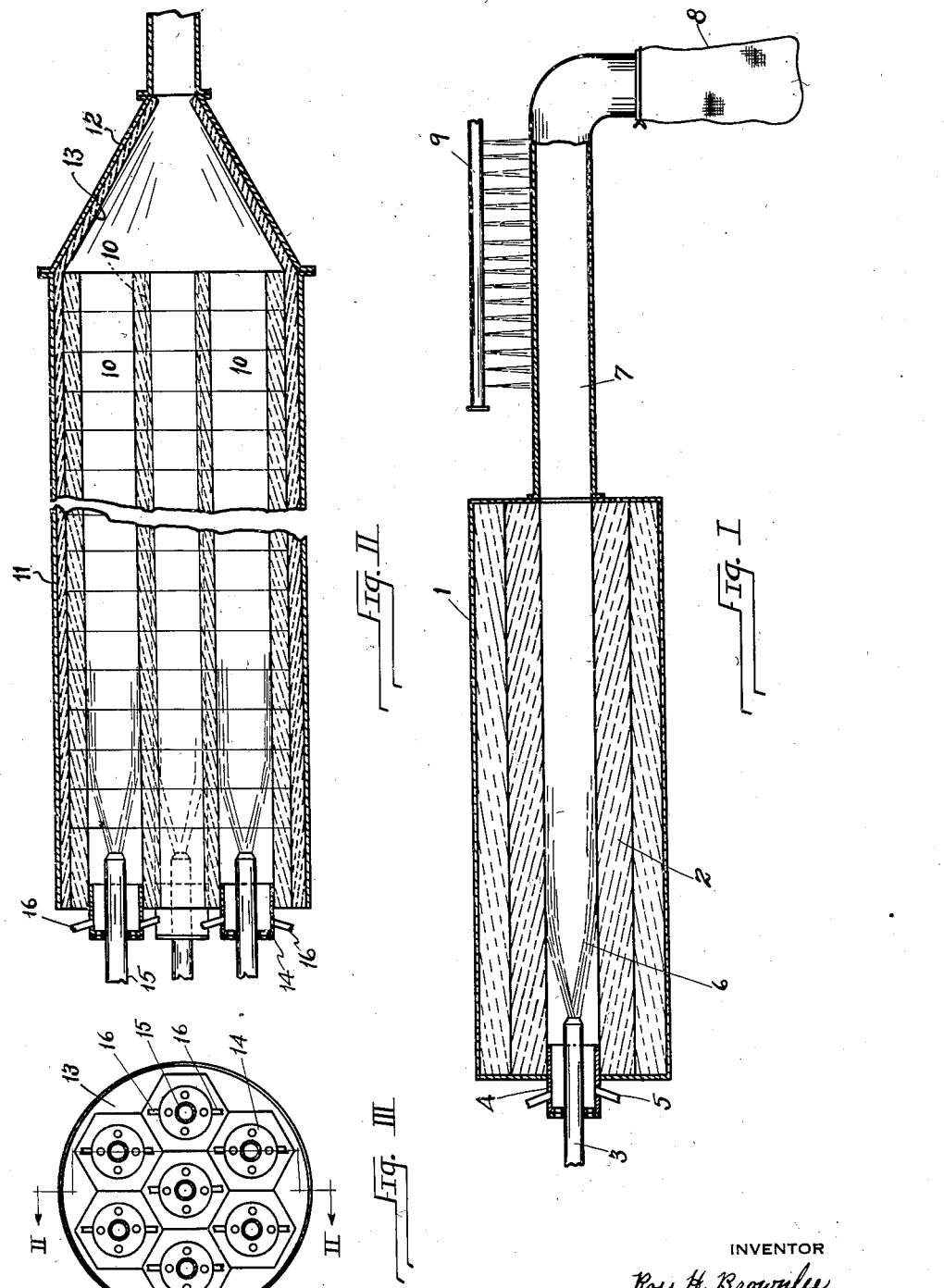
INVENTOR
Roy H. Brownlee
by Christy Christy and Wharton
his attorneys Patented Sept. 5, 1933

1,925,131

UNITED STATES PATENT OFFICE 1,925,131

CARBON BLACK PRODUCER

Roy H. Brownlee, Pittsburgh, Pa.

Application December 26, 1931
Serial No. 583,370

1 Claim. (Cl. 134—60)

This invention relates to apparatus for the production of carbon black by a disassociation process.

Considered specifically, my apparatus is so organized as to constitute one means for conducting a disassociation process of hydrocarbon gas or atomized liquid in accordance with the method principally disclosed in my co-pending application, Serial No. 446,849, filed April 24, 1930, for an improvement in a method of producing carbon black. With reference to that method, the apparatus is of the type to conduct such disassociation method in relatively small unit furnaces, being particularly suitable for the production of a limited quantity of carbon black at or near the location of its use.

In the accompanying drawing Figure I is a longitudinal sectional view showing a single-tube unit apparatus for the production of carbon black; Figure II is a sectional view through a multiple-tube unit, taken on plane II—II of Figure III; and Figure III is an end elevation of the apparatus shown in Figure II.

With reference to Figure I, the apparatus comprises a furnace 1, which comprises an inner lining tube 2 of highly refractory material. The lining 2 is relatively restricted in its cross-sectional area and is interiorly circular in cross-section, in order to avoid shoulders upon which carbon black produced in the tube might collect. At one end of the tube is a burner 3 for gas or finely-atomized oil. This burner is desirably of a type capable of projecting a hollow flame of relatively short length and of relatively great heat intensity. The outer portion of this hollow flame, or cone of flame, impinging directly against the interior surface of the tube, heats a region forming a substantially continuous zone or band on the interior surface to a high temperature.

The hollow flame itself in the region of its impingement against the interior surface of the refractory tube, and the highly heated region or band of refractory, constitute a relatively narrow disassociation zone at a temperature adequate for the disassociation of a suitable hydrocarbon into carbon black and gas, such disassociation temperature being desirably in the range between 1000° centigrade and 1400° centigrade.

A suitable hydrocarbon for disassociation, desirably a natural gas consisting largely of the hydrocarbon methane, is introduced rearwardly of the flame, and desirably into a tubular fitting or gland 4, surrounding the body of the burner and terminating rearwardly of its tip. Gas introduced into this fitting 4, by way of one or more gas inlet pipes 5, tends to follow the walls of the tube in a stream which passes through the outer region of the flame cone 6, and also passes closely adjacent the highly heated band on the interior surface of the refractory tube. In this passage it is subjected not only to relatively high temperature, but to heat units supplied both directly by the flame and by the highly heated refractory. As the heating effect is great and the zone of disassociation is narrow, there is a substantially instantaneous decomposition of the hydrocarbon gas into carbon black and gas. It should be noted that the burner should be so regulated as to produce substantially complete combustion of its fuel, thereby avoiding the presence of any large amount of excess oxygen in the furnace.

The means for removing the mixed stream of carbon black and gas as produced by disassociation, and for separating the carbon black from the stream are shown roughly and somewhat diagrammatically. As shown, the cooling and collecting means comprise a conduit 7 in communication with the outlet terminal of the disassociation tube, and opening into suitable screening means such as a fabric sack or sacks 8. As shown, the conduit 7 is cooled by means of spray-cooling apparatus 9. While the conduit 7 may be of any desired length competent to obtain a lowering in temperature of the products suitable for separation of the carbon black and gas, cooling means should act upon conduit 7 closely adjacent the outlet terminal of the furnace tube. This is for the reason that subjection of the carbon black to continued high temperature produces marked deterioration of this product, and it is therefore important to lower the temperature of the mixed carbon black and gas materially immediately after their production.

If the flame 6 is of such nature, due to proper regulation of the burner, that it does not supply oxygen for combustion of disassociated hydrogen, the flame 6 itself and the disassociation zone comprising the flame and the band of refractory is so short that the temperature of the tube itself, lying beyond the disassociation zone, is below the temperature of disassociation. This in itself avoids prolonged subjection of the products to decomposing temperature, and avoids deterioration of any substantial portion of the carbon black while in the furnace.

The modified form of apparatus shown in Figures II and III is identical, save that a plurality of furnace tubes 10 are nested together within a common shell 11. As shown in Figure II, this shell provides a common outlet 12 for all of the tubes 10. Desirably, as shown, the furnace tubes 10 are for this nesting formed with a polygonal exterior surface, while preserving the circular interior surface of the single furnace tube 1. Within the common outlet 12, and packed around the nested tubes 10, is a lining 13 of suitable heat-insulating material such as the special kieselguhr known popularly as silocel.

Each of the furnace tubes 10 is provided with its individual burner 14, gas inlet fitting 15, and gas supply pipes 16. Each of the furnace tubes 10 therefore functions as an individual disassociation furnace similarly to the furnace tube 1 shown in Figure I of the drawing.

As stated above, the apparatus has the advantage of providing a relatively short disassociation zone, capable of supplying to the hydrocarbon being disassociated heat units, both from the flame and from the reservoir of heat provided by the heated band of refractory, thus producing efficient disassociation without prolonged subjection to a temperature as high as the temperature range of disassociation. The advantage of this specific apparatus is its relatively low cost and flexibility. A single tube may be utilized to provide carbon black for special limited use, and these ultimate units or tubes may be associated in any desired number, to produce a required quantity of carbon black.

I claim as my invention:

A furnace for the production of carbon black by the thermal disassociation of hydrocarbons consisting of refractory reaction tubes, a burner in each tube arranged to introduce fuel for combustion and to project flame against a relatively narrow zone of refractory to provide in each tube a relatively narrow band or zone of flame and of highly heated refractory, said burners arranged and the length of the tubes proportioned to confine flame from each burner wholly within each tube, and fluid inlet means in each tube for the introduction of a fluid hydrocarbon for disassociation, the outlet terminal of each tube being confined into an outlet conduit for products of disassociation at the end of the tube opposite its burner.

ROY H. BROWNLEE.